United States Patent
Cardona et al.

(10) Patent No.: US 12,490,861 B2
(45) Date of Patent: Dec. 9, 2025

(54) RAPID IR TOASTER

(71) Applicant: Marmon Foodservice Technologies, Inc., Osseo, MN (US)

(72) Inventors: Jose Enrique Cardona, Pasadena, CA (US); Constantine Bovalis, Chicago, IL (US); Joseph Ricker, Buffalo Grove, IL (US); William James Fienup, Chicago, IL (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 524 days.

(21) Appl. No.: 18/046,761

(22) Filed: Oct. 14, 2022

(65) Prior Publication Data

US 2023/0117879 A1 Apr. 20, 2023

Related U.S. Application Data

(60) Provisional application No. 63/275,787, filed on Nov. 4, 2021, provisional application No. 63/256,288, filed on Oct. 15, 2021.

(51) Int. Cl.
*A47J 37/08* (2006.01)
*A23L 5/10* (2016.01)
(Continued)

(52) U.S. Cl.
CPC ............ *A47J 37/085* (2013.01); *A23L 5/15* (2016.08); *G06V 20/68* (2022.01); *H04N 23/10* (2023.01); *H04N 23/55* (2023.01); *A23V 2002/00* (2013.01)

(58) Field of Classification Search
CPC ....... A47J 37/085; G06V 20/68; H04N 23/10; H04N 23/55; A23V 2002/00
(Continued)

(56) References Cited

U.S. PATENT DOCUMENTS

| 3,693,536 A | 9/1972 | Carville et al. |
| 5,558,793 A | 9/1996 | Mckee et al. |

(Continued)

FOREIGN PATENT DOCUMENTS

| CN | 101057753 A | * 10/2007 | ............... A21B 3/00 |
| DE | 102013020214 | 6/2015 | |

(Continued)

OTHER PUBLICATIONS

Machine Translation of CN-101057753-A (Year: 2025).*
(Continued)

*Primary Examiner* — Edward F Landrum
*Assistant Examiner* — Thomas J Ward
(74) *Attorney, Agent, or Firm* — Andrus Intellectual Property Law, LLP

(57) ABSTRACT

A toaster includes a rack within a toasting chamber. A lid is movable with the rack to selectively occlude an opening to the toasting chamber. A heating element within the toasting chamber is operable to direct IR energy to the bread product on the rack. An image capture device operates to acquire image data of the bread product on the rack. A controller receives the image data. The controller processor analyzes successive image data received from the image capture device. Based upon the analysis of the image data, the controller operates the heating element to achieve a predetermined toasting level of the bread product and then turn off the heating element.

19 Claims, 9 Drawing Sheets

(51) Int. Cl.
*G06V 20/68* (2022.01)
*H04N 23/10* (2023.01)
*H04N 23/55* (2023.01)

(58) Field of Classification Search
USPC .......................................................... 99/326
See application file for complete search history.

(56) References Cited

U.S. PATENT DOCUMENTS

| | | | |
|---|---|---|---|
| 5,673,610 A | 10/1997 | Stuck | |
| 6,177,654 B1 * | 1/2001 | Schackmuth | A47J 37/0857 99/349 |
| 6,305,273 B1 | 10/2001 | Sherman | |
| 6,365,210 B1 | 4/2002 | Schaible, II et al. | |
| 6,543,337 B1 | 4/2003 | Brown | |
| 6,559,882 B1 | 5/2003 | Kerchner | |
| 6,853,920 B2 | 2/2005 | Hsiung et al. | |
| 7,067,777 B2 | 6/2006 | Lee et al. | |
| 7,217,906 B2 | 5/2007 | Veltrop et al. | |
| 7,765,918 B2 | 8/2010 | Garniss et al. | |
| D634,154 S | 3/2011 | Agnello et al. | |
| 8,631,737 B2 | 1/2014 | Zhang et al. | |
| 8,637,792 B2 | 1/2014 | Agnello et al. | |
| 8,789,459 B2 | 7/2014 | Chung et al. | |
| 10,660,466 B2 | 5/2020 | Yazvin et al. | |
| 11,484,151 B2 * | 11/2022 | Tofaili | A47J 37/0807 |
| 2004/0206248 A1 | 10/2004 | Lawson | |
| 2004/0216618 A1 | 11/2004 | Lile | |
| 2006/0081135 A1 | 4/2006 | Britton et al. | |
| 2007/0254078 A1 | 11/2007 | Calzada et al. | |
| 2009/0034944 A1 | 2/2009 | Burtea et al. | |
| 2010/0239724 A1 | 9/2010 | Veltrop et al. | |
| 2010/0275789 A1 | 11/2010 | Lee et al. | |
| 2011/0303100 A1 | 12/2011 | Agnello et al. | |
| 2012/0076351 A1 | 3/2012 | Yoon et al. | |
| 2012/0163780 A1 | 6/2012 | De Luca | |
| 2012/0164022 A1 | 6/2012 | Muginstein et al. | |
| 2012/0294595 A1 | 11/2012 | Veltrop et al. | |
| 2012/0295210 A1 | 11/2012 | Veltrop et al. | |
| 2014/0144331 A1 | 5/2014 | Hensel et al. | |
| 2014/0322408 A1 | 10/2014 | Khosla et al. | |
| 2015/0289324 A1 | 10/2015 | Rober et al. | |
| 2016/0120362 A1 | 5/2016 | Fields et al. | |
| 2016/0198885 A1 | 7/2016 | Logan et al. | |
| 2016/0327281 A1 | 11/2016 | Bhogal et al. | |
| 2017/0074522 A1 | 3/2017 | Cheng | |
| 2017/0195542 A1 | 7/2017 | Thomas et al. | |
| 2017/0332841 A1 | 11/2017 | Teischmann | |
| 2018/0131187 A1 | 5/2018 | Batzler et al. | |
| 2018/0202667 A1 | 7/2018 | Cheng | |
| 2018/0289209 A1 | 10/2018 | Yazvin et al. | |
| 2018/0338354 A1 | 11/2018 | Bassill et al. | |
| 2019/0167040 A1 | 6/2019 | Bauer et al. | |
| 2019/0387926 A1 | 12/2019 | Shei et al. | |
| 2020/0288912 A1 | 9/2020 | Shei et al. | |
| 2021/0059472 A1 | 3/2021 | Shei et al. | |

FOREIGN PATENT DOCUMENTS

| | | | | |
|---|---|---|---|---|
| EP | 0563698 | | 1/1997 | |
| ES | 2735313 A1 | * | 12/2019 | ............... A21B 3/00 |
| GB | 2587788 A | * | 4/2021 | ............ A47J 37/085 |
| WO | 2002060302 | | 8/2002 | |
| WO | 2014053002 | | 4/2014 | |
| WO | 2016131109 | | 8/2016 | |
| WO | 2019238994 A1 | | 12/2019 | |

OTHER PUBLICATIONS

Machine Translation of ES-2735313-A1 (Year: 2025).*
Machine Translation of GB-2587788-A (Year: 2025).*
Extended European Search Report for Application No. GB22202025.7, dated Mar. 13, 2023.

* cited by examiner

RAPID IR TOASTER

CROSS-REFERENCE TO RELATED APPLICATIONS

The present application claims priority of U.S. Provisional Application No. 63/256,288, filed on Oct. 15, 2021, and claims priority of U.S. Provisional Application No. 63/275,787, filed on Nov. 4, 2021, the contents of which are incorporated herein by reference in their entireties.

BACKGROUND

The present disclosure is related to the field of toasters. More specifically, the present disclosure is related to toasters with features for improved toasting speed, thermal capacity, and/or toasting control.

Foods, particularly baked goods which may include, but are not limited to, bread slices, buns, bagels, or English muffins are frequently toasted before being served to a customer. Toasting involves exposing the food to heat energy through one or more of radiant, conductive, or convective energy transfer. Toasted food products have a distinctly different flavor than the same products before toasting. Toasting a food product also changes the bread product's color and its texture. In addition to changing flavor, color, and texture, the toasting process often gives off a pleasing aroma. The process of toasting, which is also referred to herein as browning, is the result of a chemical reaction known as the Maillard reaction. The Maillard reaction is the reaction between carbohydrates and proteins that occurs upon heating and which produces browning.

It is believed that when the Maillard reaction goes too far or too long, carbohydrates in a bread product will oxidize completely and form carbon. Carbon absorbs light. The surface of a burned bread product, therefore, appears black. The term "burn" is therefore considered to be the thermally-induced oxidation of carbohydrates to a point where the carbon content of the bread product surface is high enough to absorb visible light that impinges on the bread product surface and therefore makes the surface, or portions of the surface, of the bread product, appear to an ordinary observer to be black in color.

Toasters are known to be challenged with consistently toasting subsequent bread products with inconsistent surfaces, for example, the crumb sides of an English muffin. Toasters are further known to be challenged with achieving consistent toasting results when there is a variation in density or starting temperature of subsequent bread products.

BRIEF DISCLOSURE

The present disclosure is related to the field of toasters. More specifically, the present disclosure is related to toasters with features for improved toasting speed, thermal capacity, and/or toasting control.

Mechanical thermal management components of the toaster enable the selective management of the heat conditions created in the toaster during operation thereof. Improved management of the heat within the toaster can lead to improved toasting speed, improved ability to toast food products of varying density and/or initial temperature, and can lead to improved toasting control.

The mechanical thermal management components include but are not limited to heat retention lids which may be configured to selectively occlude one or more openings into the toaster. The mechanical thermal management components may further include a shutter that selectively occludes a camera aperture. The shutter blocks the camera from being exposed to a portion of the heat energy generated by the toaster during operation. By selectively blocking the camera from a portion of the heat energy, the shutter improves camera function and longevity. In still further examples, the mechanical thermal management components are operated in coordination with one or more systems of the toaster, and exemplarily in coordination with one another.

Further details and examples of toasters are exemplarily provided in U.S. Pat. No. 10,660,466, entitled, "Toaster with Adjustable Conveyor", Pending US Patent Application Publication No. 2019/0387926, entitled, "Infrared Toaster" and Pending US Patent Application Publication No. 2020/0288912, entitled, "Infrared Toaster," all of which are incorporated by reference in their entireties. It will be recognized that any of the features as disclosed in the present application may be combined with any of the toasters or features as disclosed in those references to arrive at further examples other than those as explicitly described herein while remaining within the scope of the present disclosure.

An example of a toaster includes a housing that defines a toasting chamber. A rack is configured to hold a bread product within the toasting chamber. A lid is movable with the rack between an open condition and a closed condition. In the closed condition the lid occludes an opening into the toasting chamber. A heating element is arranged within the toasting chamber interior of the housing and relative to the rack. The heating element is operable to direct IR energy to the bread product on the rack. An image capture device is positioned exterior of the housing. The image capture device operates to acquire image data of the bread product on the rack. A controller receives the image data. The controller processor analyzes successive image data received from the image capture device. Based upon the analysis of the image data, the controller operates the heating element to achieve a predetermined toasting level of the bread product and then turn off the heating element.

In examples, the lid is movably connected to the housing relative to the opening through the housing. The rack is movable relative to the opening to receive and expel the bread product through the opening. The lid is configured to maintain a thermal environment within the toasting chamber during operation of the toaster. An aperture is between the camera and the toasting chamber through the housing. A shutter is positioned between the image capture device and the toasting chamber. The shutter is movable away from the camera. The controller is configured to operate the shutter in coordination with the camera to move the shutter away from the image capture device prior to a first acquisition of image data, to return the shutter to the position between the image capture device and the toasting chamber, and to subsequently move the shutter away from the image capture device prior to a second acquisition of image data. A convex lens may be positioned between the image capture device and the aperture. The convex lens may be positioned with a focal point of the convex lens at the aperture.

In further examples, a mirror is positioned exterior of the housing and proximate the aperture. The mirror is angled relative to the aperture and the image capture device is positioned such that a field of view of the image capture device captures a reflection of the bread product in the toasting chamber through the aperture. The housing may be insulated to provide a thermal barrier between the toasting chamber and the image capture device. An LED ring light is positioned between the mirror and the image capture device.

The image capture device may be a camera. The camera is configured to acquire a plurality of images of the bread product in the toasting chamber. The controller further configured to process the acquired images and to determine the toasting of the food product and to control the toasting process carried out by the toaster. The image capture device may be an RGB sensor.

The controller selects a toasting time based upon an identification of a bread product type and an input of a toasting level and the controller analysis of the image data determines when the bread product reaches an initial toasting level ($T_0$), starts a timer, and terminates the toasting operation when the selected toasting time has elapsed. The controller determines that the bread product has reached the initial toasting level upon detection of toasting in the image date in one or more subregions within the field of view of the image sensor. The controller may further analyze the image data to determine the identification of the bread product type. The heating element may include a plurality of heating element segments arranged in a low density portion proximate the lid and a high density portion away from the lid, wherein the heating element segments in the high density portion are spaced apart at a first distance, and the heating element segments in the low density portion are spaced apart at a second distance, the second distance being greater than the first distance. The first distance may be 25%-80% of the second distance.

A method of toasting a bread product includes receiving a toasting level for the bread product. A bread product type is identified. A lid is closed to occlude the toasting chamber with the bread product therein. A heating element is operated to emit IR energy at the bread product. Image data of a field of view comprising a portion of the bread product is successively obtained. The successively obtained image data is analyzed. The heating element is operated to achieve the toasting level of the bread product. The heating element is subsequently turned off and the bread product is ejected from the toasting chamber.

In examples of the method, the successively obtained image data includes analysis of image data starting with energization of the heating element until determining that the bread product has reached an initial toasting level ($T_0$). The method may further include selecting a toasting time based upon the identification of the bread product type and the received toasting level. A timer may be started upon determining that the initial toasting level has been reached. The heating element may be turned off and the bread product ejected from the toasting chamber when the toasting time has elapsed on the timer. Identifying the bread product type may further include analyzing the image data to determine an identification of the bread product type.

DETAILED DISCLOSURE

Figure 1:
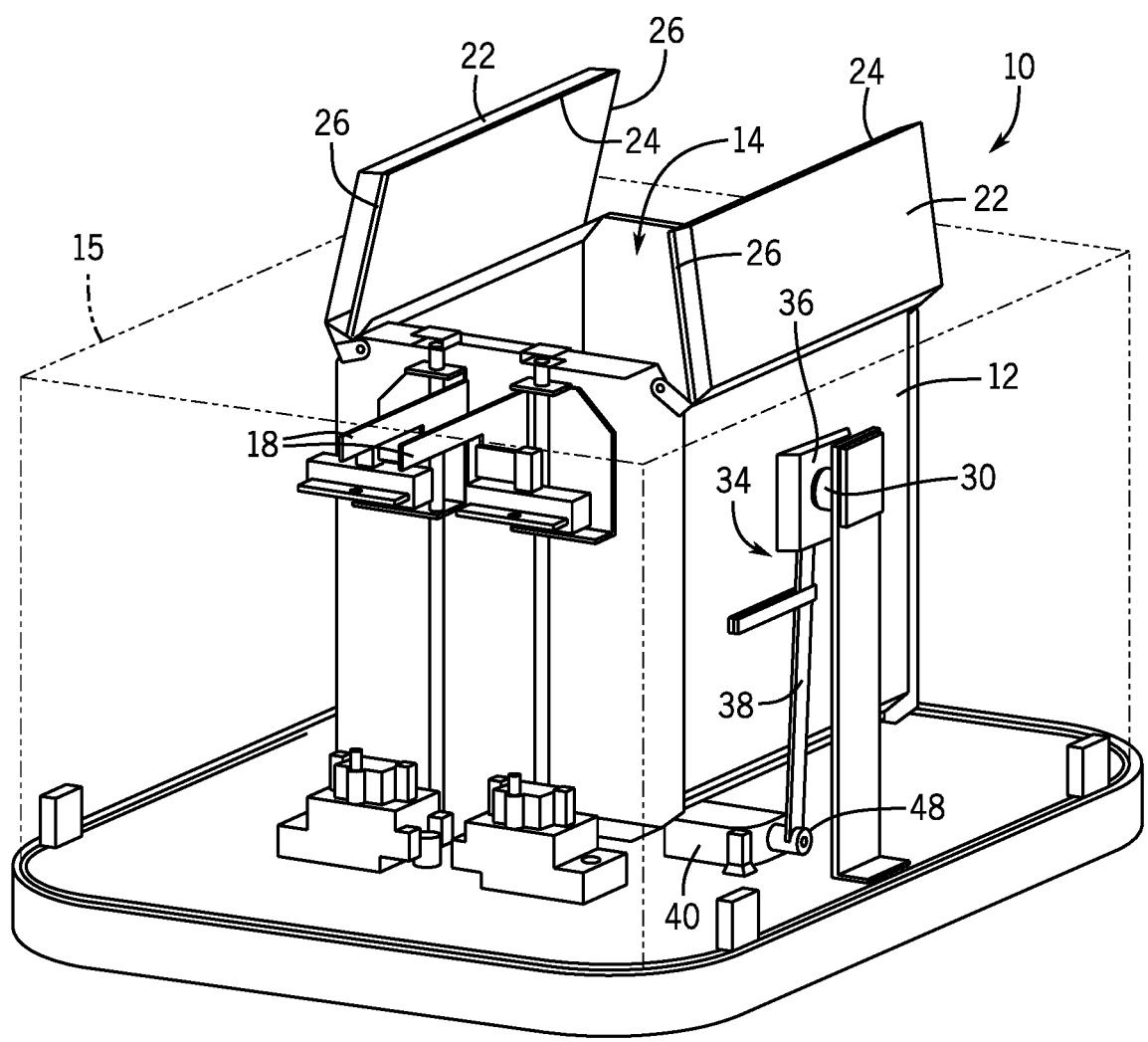
FIG. 1 is a perspective view of an example of a toaster with the lids in the open position.

FIG. 1 depicts an example of a toaster 10. The features as disclosed herein with respect to the toaster 10 may improve the toasting speed, thermal capacity, and/or toasting control of the toaster 10. The toaster 10 includes an internal housing 12 which defines a toasting chamber 32 within which the baked good is received and toasted. The internal housing 12 may further be within an exterior housing 15 which may define or partially define the side, bottom and/or top of the toaster. The exterior housing 15 is shown herein in dashed lines or removed altogether to better depict the contents of the toaster 10 within the exterior housing 15. sides and/or a bottom of the toaster 10. In further examples, including those not shown, the internal housing 12 and/or the exterior housing 15 may further define a top or partially define a top of the toaster 10 as well. The toaster 10 includes at least one opening 14, which may be configured as described herein to receive food, and for example to receive at least one piece of baked good.

In the example shown in FIG. 1, the toaster 10 includes a single opening 14 which is configured to be capable of simultaneously receiving two pieces of baked goods. It will be recognized that in other examples, the toaster 10 may include two openings 14, or for example, an opening for each piece of baked good for which the toaster 10 is configured to simultaneously receive. That is, in further examples, if the toaster is configured to be capable of simultaneously receiving two pieces of baked goods, then the toaster is configured with two openings. Three openings may configure a toaster to simultaneously receive three pieces of baked goods, etc.

Racks 16 (See the cross-sectional view of FIG. 3) are configured to receive the piece of baked good thereon, each of the racks 16 coupled to handles 18 which may operate individually or in combination to lower the racks 16 with the piece of baked good thereon into the toaster 10, and exemplarily between heating elements 20. Each handle 18 may be individually connected to a rack 16 such that individual operation of a handle individually translates a rack 16 within the toaster. In an example, one handle 18 may be fixed with an arm that engages the other handle. In this example, one handle 18 and rack 16 are independently movable, while the other handle 18 engages the first handle 18 to simultaneously move both handles 18 and racks 16. The heating elements 20 are exemplarily constructed of resistive wire, which convert electrical energy into heat and light energy within the toaster 10. In an example, the resistive wire is a 28Ga Nichrome wire. Although other wire sizes and material will be recognized from the present disclosure.

Figure 2:
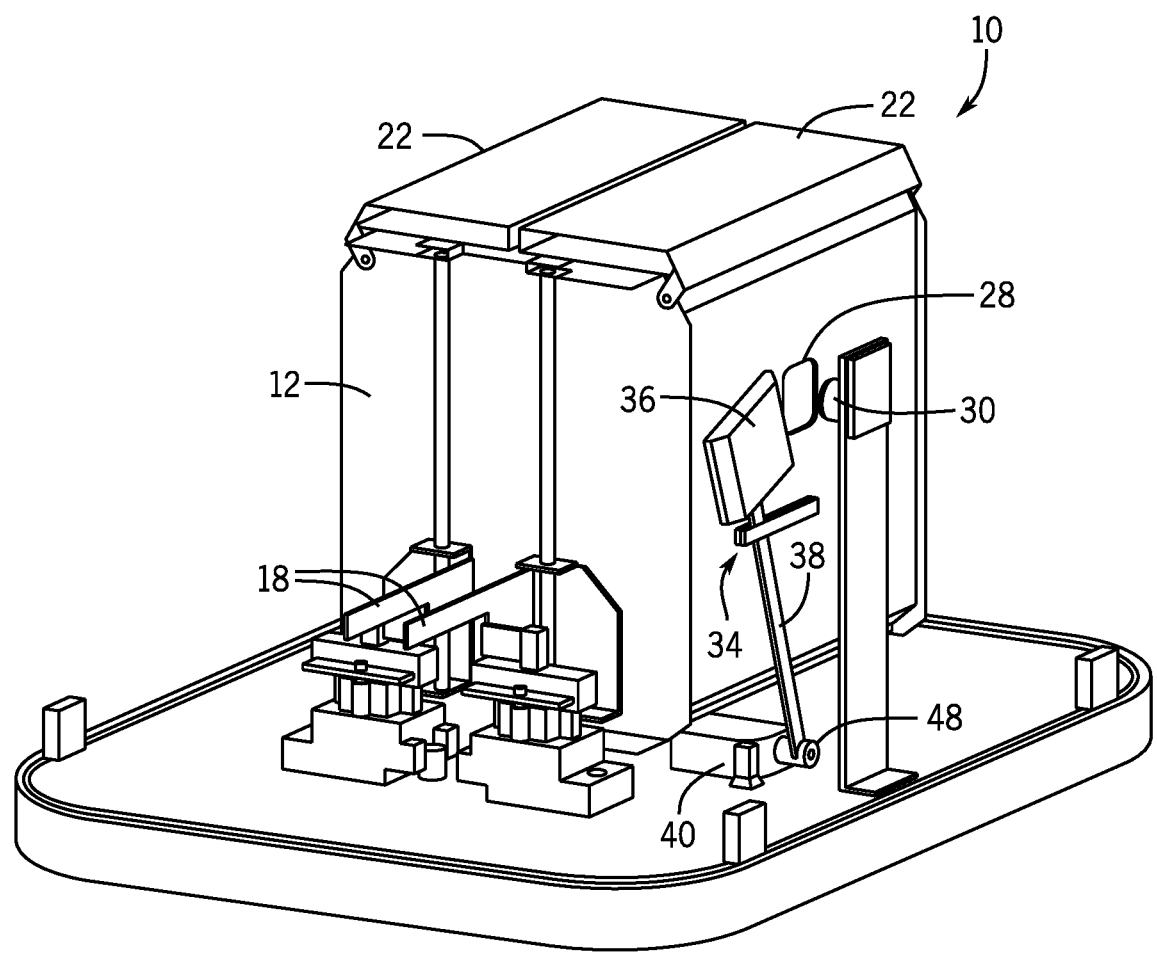
FIG. 2 is a perspective view of an example of a toaster with the lids in the closed position.

The toaster 10 further includes lids 22 which are operable to move between open and closed positions. FIG. 2 exemplarily depicts the toaster 10 with the lids 22 in the closed position. The lids are exemplarily constructed of metal and may be of a similar construction as the internal housing 12 of the toaster. As shown in FIG. 1, the lids 22 may have a double layered construction in which air between the layers of the lids 22 acts as an insulator, such that the exterior surface of the lid 22 is cooler than the surface facing the opening 14. In other examples, the lids 22 may be constructed of a plastic or polycarbonate material that exhibits an insulative property against heat transfer. In the open position, the lids 22 are out of the way from the openings 14 such as to permit a piece of baked good to enter the opening 14 and to be received on the rack 16. When the lid 22 in the closed position, the lid 22 covers and/or occludes the opening 14. The lids 22, thus operate to retain the pieces of bread product within the toaster and to prevent access to the interior of the toaster, for example when the heating elements are energized. This can help to protect a user from shock or burn while the toaster is in operation, or the unintended insertion of objects into the toaster 10 while the toaster is in operation.

The lids 22 may include a lip 24 or gasket 26 about the edge of the lid and which form a seal about the opening 14, while in other examples, the lids 22 may include vents, such that water vapor formed by the heating of the bread products within the toaster is permitted to escape. The lids 22 further retain heat within the toaster 10 during operation of the toaster and energization of the heating elements 20.

The lids 22 are movably connected to the internal housing 12. The lids may be pivotably connected or may be slidingly connected, or may move in another manner relative to internal housing 12 across the opening 14, including, but not limited to z-folding. The lids 22 are mechanically connected to the handles 18, such that movement of the handles 18 between an open position wherein the handle is in a position to move the rack 16 towards the opening 14 to facilitate removal or insertion of a piece of baked good to/from the toaster 10. In this same position, a mechanical linkage between the handle 18 and the lid 22 moves the lid 22 to the open position as well. As the handle is moved to another position in which the rack 16 is moved away from the opening 14, to lower the piece of baked good into the toaster 10 and between the heating elements 20, the lid 22 is similarly moved to the closed position. As described, the lids 22 may be independently operated by the handles, while in other examples, actuation of a handle operates multiple lids 22 simultaneously. In an further example, a single lid extends across multiple openings. It will further be recognized that the lids 22 and the handles 18 may be electrically connected, such that actuation of the handle 18 results in an electrical signal, for example to operate a motor to drive the lids 22 between the respective open position and closed position.

Figure 3:
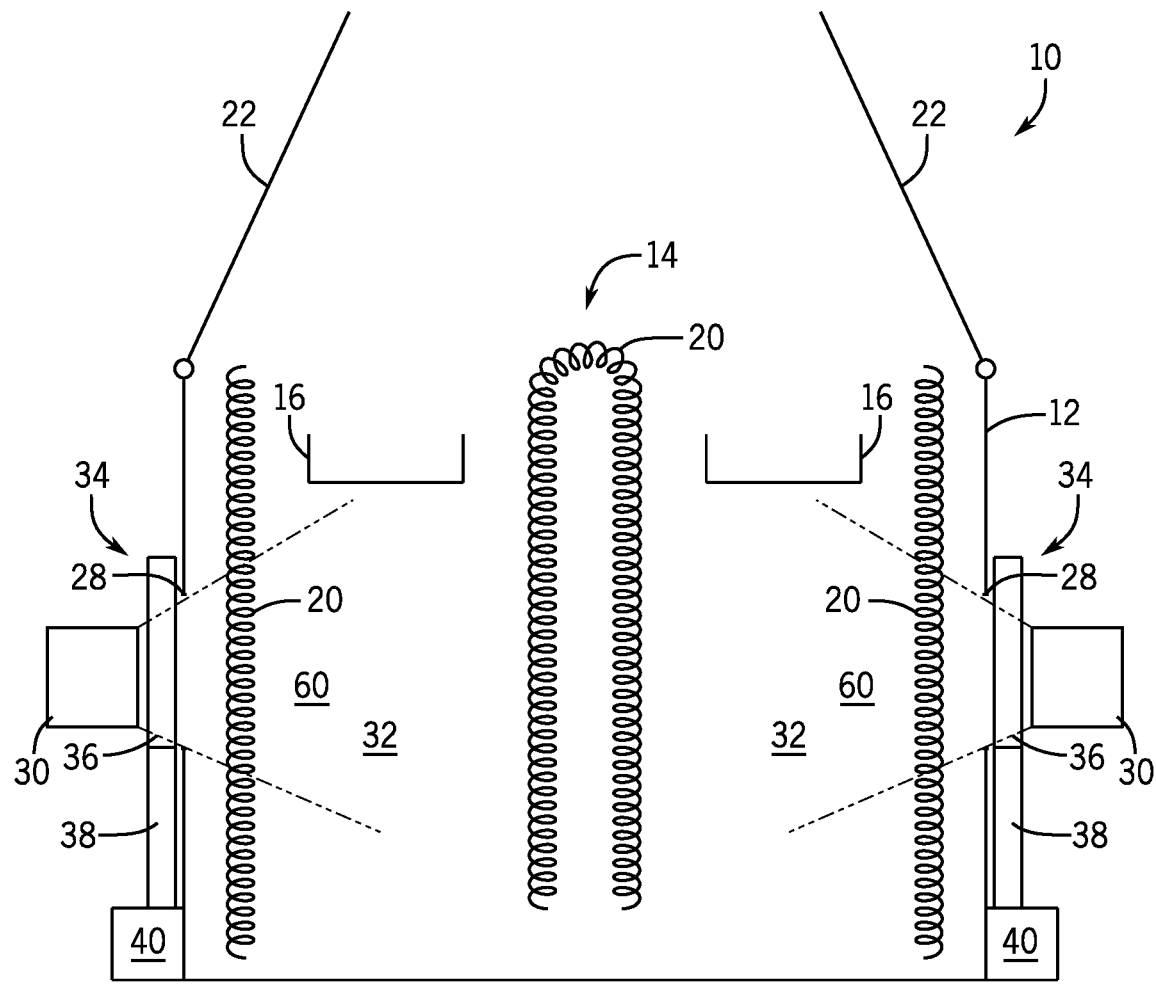
FIG. 3 is a sectional view of the toaster of FIG. 1.

As explained in further detail in US Patent Application Publication Nos. 2019/0387926 and 2020/0288912, one or more image sensors cameras may be used to monitor the progression of the toasting process within the toaster. It will also be recognized that the camera may capture image data in the form of digital images or may exemplarily be an RGB sensor which collects the image data. In embodiments, the image analysis may be performed on image data comprising digital images or RGB intensities captured by the camera. However, the conditions created within the toaster to carry out the toasting effect are also harsh on electronics such as the cameras sought to be used to monitor the toasting progression and from which the operation of the toaster is controlled. Therefore, the inventors have developed further thermal protection for the camera 30. FIGS. 1-3 depict, among other things, a first example of thermal protection for the camera 30 although it will be recognized that the features of the toaster 10 otherwise described with respect to FIGS. 1-4 may otherwise be used with other examples of camera thermal protection as described herein.

Referring back to FIG. 3, the internal housing 12 includes an aperture 28 therethrough. The internal housing 12 defines the toasting chamber 32 which functions to retain the heat energy about the bread product. The internal housing 12 may also include insulation or other thermal protection. The camera 30 is positioned exterior of the housing, for example, and in alignment with the aperture 28 such that a field of view of the camera extends through the aperture 28 into the toasting chamber 32 of the toaster 10. It will be recognized that other configurations of the internal housing 12 may be used while remaining within the scope of the present disclosure. For example, a further exterior housing 15 shown in dashed lines in FIG. 1, may surround the internal housing 12. Components as described herein as well as insulation may be positioned in the space between the internal housing 12 and the exterior housing 15. In a still further example, the camera 30 may be interior of the internal housing, and a space about the camera 30 and between the internal housing 12 and the heating element 20 and or toasting chamber 32 defined by insulation, for example, polymer foam.

A shutter 34 is movable relative to the aperture 28 and camera 30. The shutter 34 includes a panel 36 attached to an arm 38. The panel 36 is configured to be positioned between the camera 30 and the toasting chamber 32, for example, across the aperture 28. The panel 36 provides thermal protection to the camera 30, but is movable as described in further detail herein to expose the toasting chamber 32 to the field of view of the camera 30. The shutter 34 is movable between the closed position, where the camera 30 is protected, and the open position wherein the camera 30 is exposed. A motor 40 may be used to move the shutter 34 between the open and closed positions. The motor 40 may operate to pivot the arm 38 and thus the panel 36 of the shutter 34. The arm 38 may be secured to the motor 40 at a pivot point 48 and motive power transferred from the motor 40 to the shutter 34. In other examples, the shutter may be moved in other manners, including, but not limited to sliding along rails, a screw gear, a rack and pinion and may be moved by other motive systems, including, but not limited to electromagnets.

Figure 5:
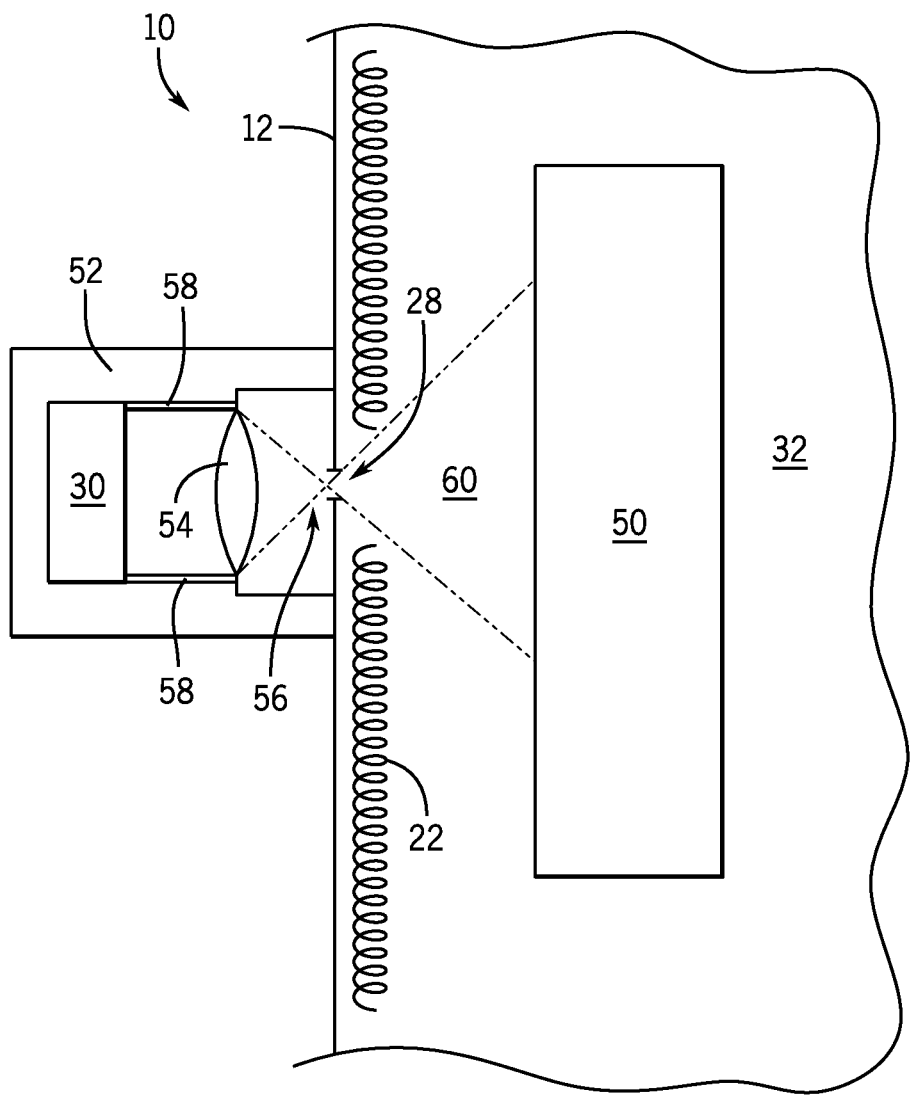
FIG. 5 is a partial sectional view of a further example of thermal protection for the camera.

FIG. 5 is a partial sectional view showing a further example of thermal protection for the camera 30. It will be recognized that features as shown and described with respect to FIG. 5 may be used with or combined with any of the features as shown and described above, including those shown with respect to FIGS. 1-3. Similarly, the features shown and described with respect to FIGS. 1-3 may be used in combination with one or more of the features shown and described with respect to FIG. 5. The toaster 10 uses a camera 30 outside of the internal housing 12 to capture images of the bread product 50 within the toasting chamber 32. In FIG. 5, the camera 30 is held in a camera housing 52 and a convex lens 54 is positioned within the camera housing 52 between the camera 30 and the aperture 28. The convex lens 54 is spaced apart from the aperture 28 by a distance of the focal length of the lens 54. This positioning places the focal point 56 of the lens 54 within or proximate to the aperture 28. By positioning the lens 54 in this manner, the size of the aperture 28 can be reduced or minimized, resulting in the benefits as described herein. While exact alignment of the focal point 56 within the aperture 28 is disclosed herein, it will be recognized that in further examples, the focal point 56 may be proximate the lens 54 or proximate the baked product 50 from the aperture 28. While this may result in a slightly larger aperture 28, such examples may produce further design benefits as described herein. In one example, the focal point 56 may be proximate the lens 54 from the aperture 28 so as to increase the field of view of the camera on the baked product 50. In another example, the focal point 56 is proximate the baked product 50 from the aperture 28 to accommodate the thickness of the internal housing 12 and/or the heating element 20, to minimize the size of the aperture 28 through the internal housing 12 and past the heating element 20. The camera housing 52 includes alignment features 58 which may include grooves or projections or an adjustable fitting, for example, operated by a screw, to position the camera 30 and the lens 54 at the correct positions to achieve the focal point 56 at the intended location.

Compared to the aperture 28 shown in FIGS. 1-3, the aperture in FIG. 5 is smaller. The aperture 28 in FIGS. 1-3 must accommodate the entire field of view 60 as it extends away from the camera 30, while the aperture 28 shown in FIG. 5 need only accommodate the field of view at or near the focal point of the lens, which is much smaller. With this reduced size, less heat escapes from the toasting chamber 32, which exposes the camera 30 to less heat overall. Additionally, this further retains the heat within the toasting chamber 32. Furthermore, the lens 54 and the camera housing 52 function to provide further environmental protection for the camera from the heat and humidity within the toasting chamber 32 while in operation to toast a baked product 50. In a still further example, by reducing the size of the aperture 28, less accommodation is needed to the pattern and coverage of the heating element 20 within the toaster 10. In some examples, the aperture 28 may be of a sufficiently small size so as to achieve a same distribution and arrangement of the heating element 20 as if no aperture was present. In one example, this is exemplified by a heating element 20 in which no deviation of the heating element 20 path is exhibited in the area of the aperture 28. In such an example, as described above, the camera 30 may be used in a continuous manner acquiring and processing images of the bread product 50 to evaluate the progress of the toasting procedure, while exposing the camera 30 to reduced environmental conditions, prolonging the function and operation time of the camera 30.

Figure 6:
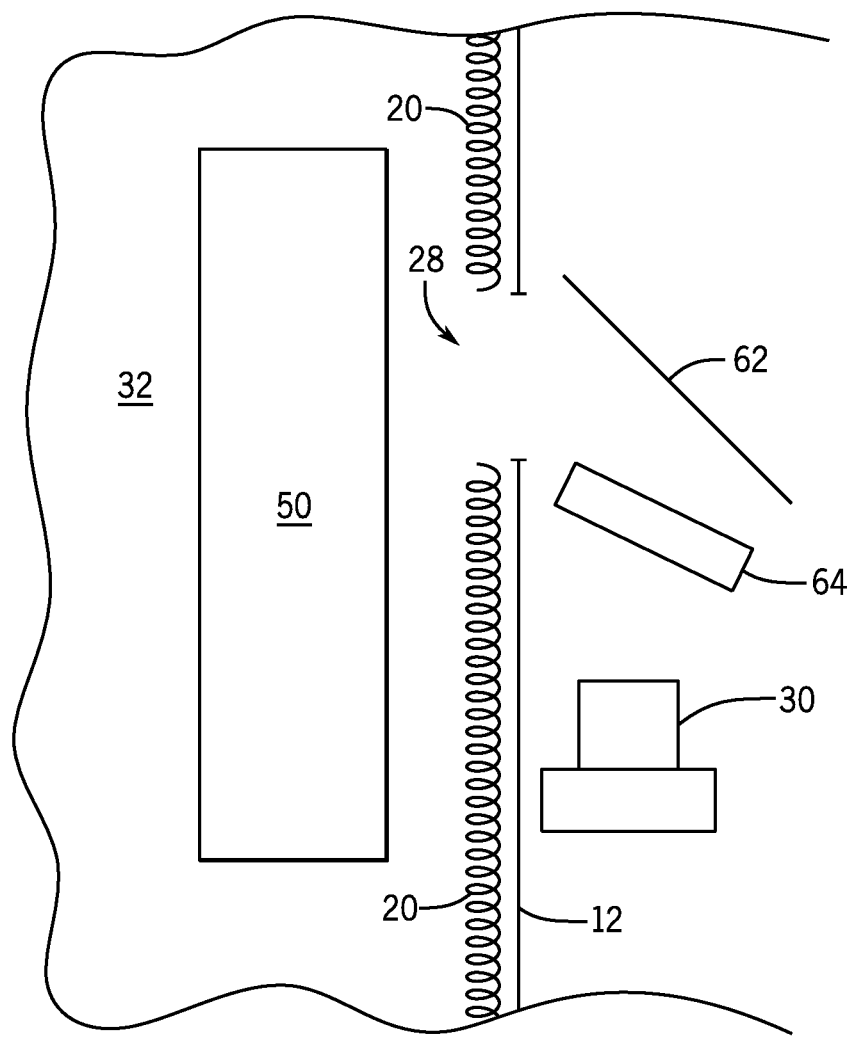
FIG. 6 is a partial sectional view of a further example of thermal protection for the camera.

FIG. 6 is a partial sectional view of a further example of an arrangement for thermal protection of the camera 30. It will be recognized that features as shown and described with respect to FIG. 6 may be used with or combined with any of the features as shown and described above, including those shown with respect to FIGS. 1-3. Similarly, the features shown and described with respect to FIGS. 1-3 may be used in combination with one or more of the features shown and described with respect to FIG. 6. The toaster 10 uses a camera 30 outside of the internal housing 12 to capture images of the bread product 50 within the toasting chamber 32. As previously described, the internal housing 12 may further include insulation to create a further barrier to the heat within the toasting chamber 32. This leaves the aperture 28 though the internal housing 12 as a path for heat to escape the toasting chamber 32 to expose the camera 30 to thermal damage. In the example shown in FIG. 6, a mirror 62 is disposed proximate the aperture 28 exterior of the internal housing 12. The mirror 62 is in an orientation of about a 45 degree angle. The camera 30 is positioned away from the aperture 28 and separated from the chamber 32 by the internal housing 12. The camera 30 is directed at the mirror 62. The angle of the mirror presents a reflection of a field of view through the aperture 28 directed at the bread product 50. The inventors have found that the reflection provides a sufficient field of view to perform the analysis of the toasting progression as described herein. An LED ring light 64 is interposed between the mirror 62 and the camera 30. The LED ring light 64 includes a plurality of light-emitting diodes (LEDs) formed in a ring or annulus to project illumination in the direction of the mirror 62, while providing the field of view of the camera 30 through the open center of the LED ring light 64.

Figure 7:
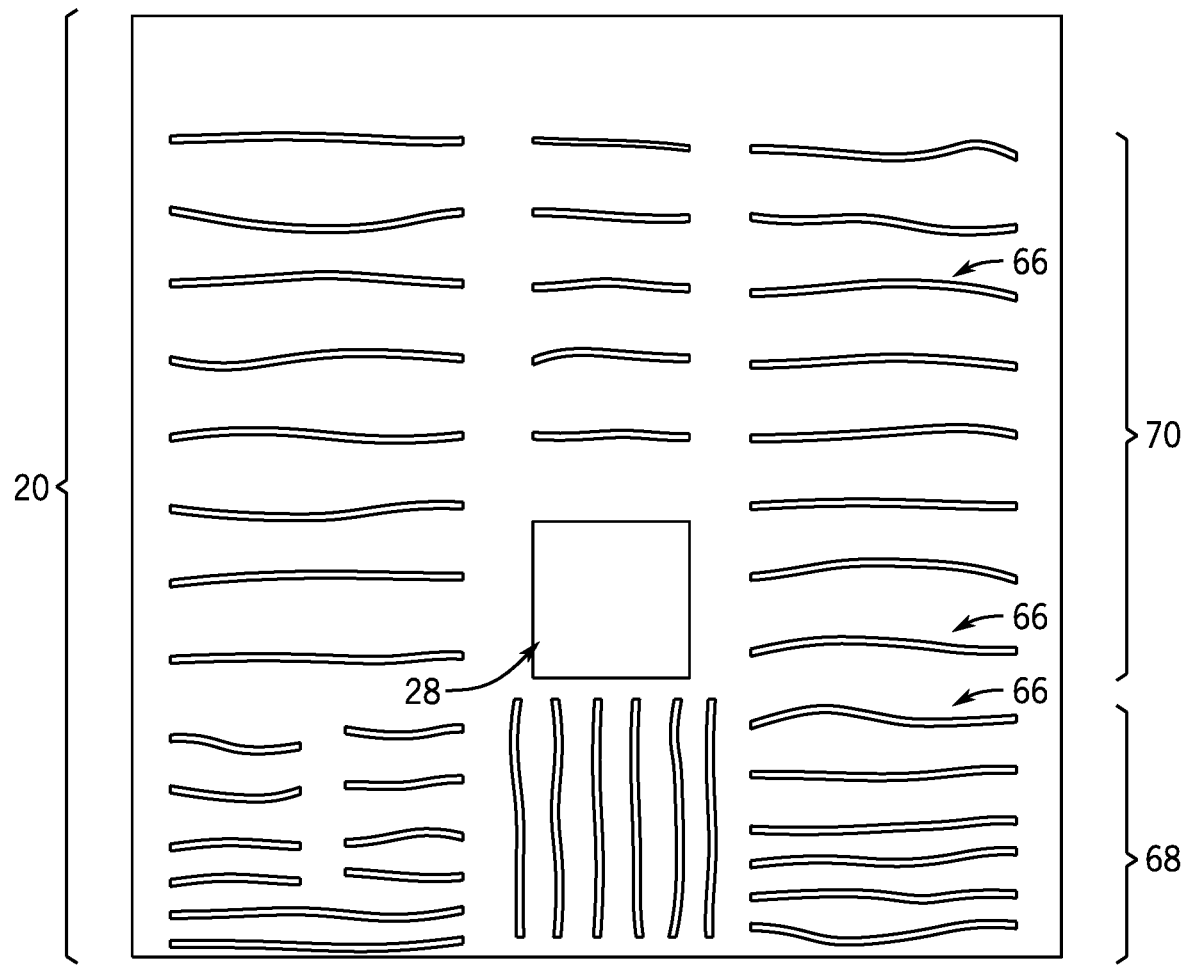
FIG. 7 is a detailed view of an example of a heating element.

FIG. 7 depicts an example of an arrangement of the heating element 21 as may be used in combination with any of the toaster arrangements as described herein. In examples wherein the resistive wire is 28Ga Nichrome wire, coiling of the wire may not be necessary, and solid or braided strands of wire. The inventors have further discovered that uneven heat distribution within the toasting chamber 32 can lead to uneven toasting progression on a bread product within the toasting chamber 32. While the previously described lids 22 improve toasting speed and efficiency within the toasting chamber by retaining additional heat within the toasting chamber 32, this can lead to over-thermalization of upper end of the bread product, the end closest to the lids 22. Therefore, the heating element 21 as shown in FIG. 7 includes a varying distribution of the heating element segments 66. The heating element 21 includes a lower portion 68 with a greater density of heating element segments 66 and an upper portion 70 with a lower density of heating element segments 66. Because the actual size of the heating element segments 66 is comparatively nominal to the area of the heating element 21, the density of the heating element segments 66 corresponds to the distance between the heating element segments 66. In an example, the distance between the heating element segments 66 of the higher density portion 68 is 25%-80% of the distance between the heating element segments 66 of the lower density portion 70. In an example, the distance between the heating element segments 66 of the higher density portion is 66% of the distance between the heating element segments 66 of the lower density portion 70. In a further example, the distance between the heating element segments 66 of the higher density portion is 50% of the distance between the heating element segments 66 of the lower density portion 70.

As previously noted, heat may escape from the toasting chamber 32 through the aperture 28. Therefore, in an example, the higher density portion 68 is at least adjacent to the aperture 28. In another example, the higher density portion 86 surrounds the aperture 28. However, in another example, heat loss through the aperture 28 may help to mitigate the heat concentration at the top of the toasting chamber 32 caused by the lids, and therefore aid in balancing the toasting effect across the bread product. In examples, the higher density portion 68 exemplarily includes a lower 20%-60% of the heating element 21. In another example, the higher density portion 68 includes a lower 25%-50% of the heating element 21. In a still further example, the higher density portion 68 includes a lower 30%-40% of the heating element 21.

The example of FIG. 7 further shows that the heating element segments 66 may be oriented in different directions, for example, the horizontally-oriented and the vertically-oriented heating element segments 66 within the greater density portion 68.

Independent from the heating element segments 66 discussed above, the toaster 10 may use pulse wave modulation (PWM), for example by the controller 42, to control the heat output of some or all of the heating element segments 66. In an example, PWM control may be used to reduce the heat output of the heating element 21 of one side of the heating chamber 32, for example, to perform a bun or bagel toasting operation where a crumb side of the bread product receives a greater thermal treatment than a crown/heel side. In a still further example, PWM control may be used to achieve a similar gradient in heat energy output as described above with the heating element segments 66 in FIG. 7, but by operating evenly spaced heating element segments to varying degrees of energy output.

Figure 4:
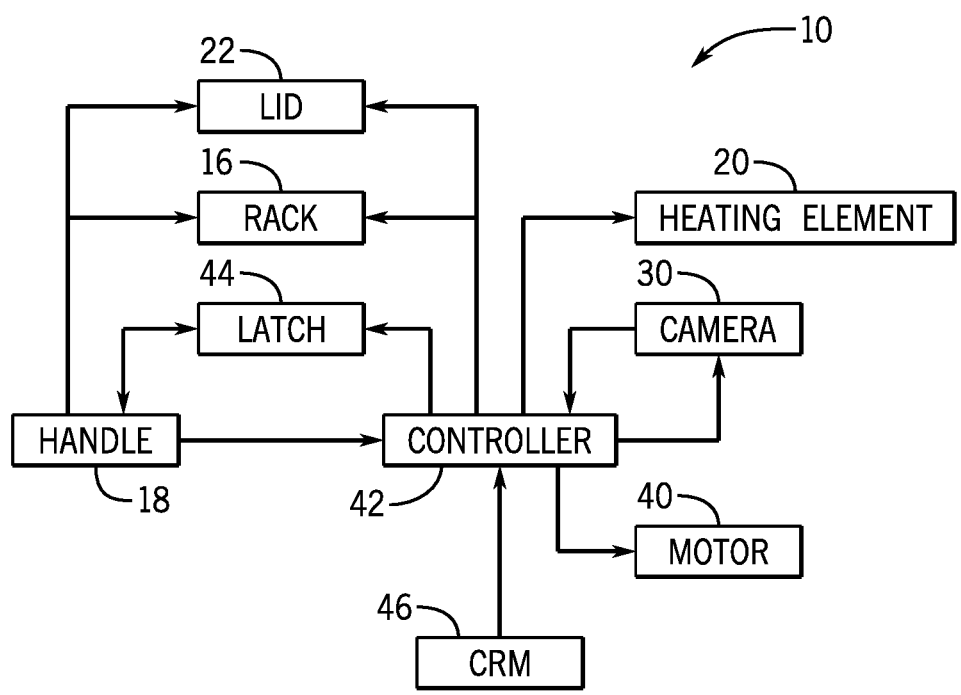
FIG. 4 is a system diagram of an example of a toaster.

FIG. 4 is a system diagram of an example of the toaster 10 as shown and described above with respect to any of the figures described herein. In operation, the toaster 10 is in the open configuration (e.g. FIG. 1 or FIG. 3) and a user inserts one or more pieces of baked good through the opening 14 past the open lids 22 to rest on the rack(s) 16. The user then operates the handle 18, for example by pressing the handle 18 downwards. The handle 18 may be mechanically connected to the lid 22 and the rack 16 such that movement of the handle 18 is transferred to the lid 22 and the rack 16 to also move the lid 22 and the rack 16 from the open position to the closed position with the piece of baked good between the heating elements 20 and the lid 22 closed over the toasting chamber 32. It will be recognized that independent handles 18 may be used to operate each rack 16 and lid 22 independently. In an example, the independent handles 18 may be positioned close together such that the handles 18 may be simultaneously actuated (pressed) by a user in a single operation or action. Movement of the handle 18 also provides a communication to a controller 42. This communication can be an electrical signal for example from closing a switch (not depicted). The communication to the controller 42 indicates that the handle 18 has been moved to the closed configuration. In an example wherein the handle 18 is mechanically connected to the lid 22 and the rack 16, this communication further indicates to the controller 42 that the rack 16 and lid 22 are in the closed positions as well. A latch 44 may retain the handle 18, and relatedly the lid 22 and rack 16 in the closed position. In another example, the lid 22 and rack 16 may be operated from the open configuration to the closed configuration based upon a signal from the controller 42. In such an example, the handle 18 provides an input which is acted upon by the controller 42 to provide operational signals to a motor or actuator to close the lid 22 and/or to lower the rack 16.

The controller 42 is communicatively connected to a computer readable medium (CRM) 46 which is non-transient and upon which is stored computer readable code in the form of computer programs or software configured for execution by the controller 42. It will be recognized that the controller 42 is exemplarily implemented any of a variety of known controller circuits, integrated circuits, microcontrollers, or associated circuitry. The controller 42 may be part of a central processing unit (CPU) which includes integrated memory, although in embodiments the CRM 46 may be a separate component or communicatively connected to the controller 42. The controller 42 accesses software or firmware in the form of computer readable code stored on the CRM 46 as either integrated memory or external memory. The controller 42 executes the computer readable code as an instruction set to carry out the functions as described herein, including the receipt of input, calculations, and outputs as will be described, both herein as well as in the previously noted applications which have been incorporated by reference herein.

Once the lid 22 and rack 16 are in the closed or operational position, the controller 42 provides a signal to energize the heating element 20 with electrical energization, the heating element 20, for example, a resistive wire heating element, heats up and transfers heat energy to the piece of baked good through IR radiation and convective heat transfer. The controller 42 further operates the camera 30 to begin acquiring images of the piece of baked product to evaluate the progression of the toasting process. The controller 42 also operates the motor 40 connected to the shutter 34 to coordinately move the shutter 34 out of the way of the camera 30 prior to the acquisition of each image or set of images by the camera 30 for analysis by the controller 42. After the acquisition of the image or images, the controller 42 returns the shutter to its closed position to protect the camera 30 from the heat of the heating elements 20.

When the controller 42 determines that the toasting process is complete for an input toasting level outcome based upon the acquired images, then the controller 42 operates the heating elements to stop energization thereof and further operates to eject the now toasted piece(s) of baked good. In an example, the controller 42 may actuate a latch 44, releasing the handle 18 to the open position. If the handle 18 is mechanically connected to the lid 22 and the rack 16, release of the latch 44 also releases the lid 22 and the rack 16 to the open positions as well. In another example, the controller 42 may provide signals to associated actuators to move the lid 22 and the rack 16 to the open positions.

Figure 8:
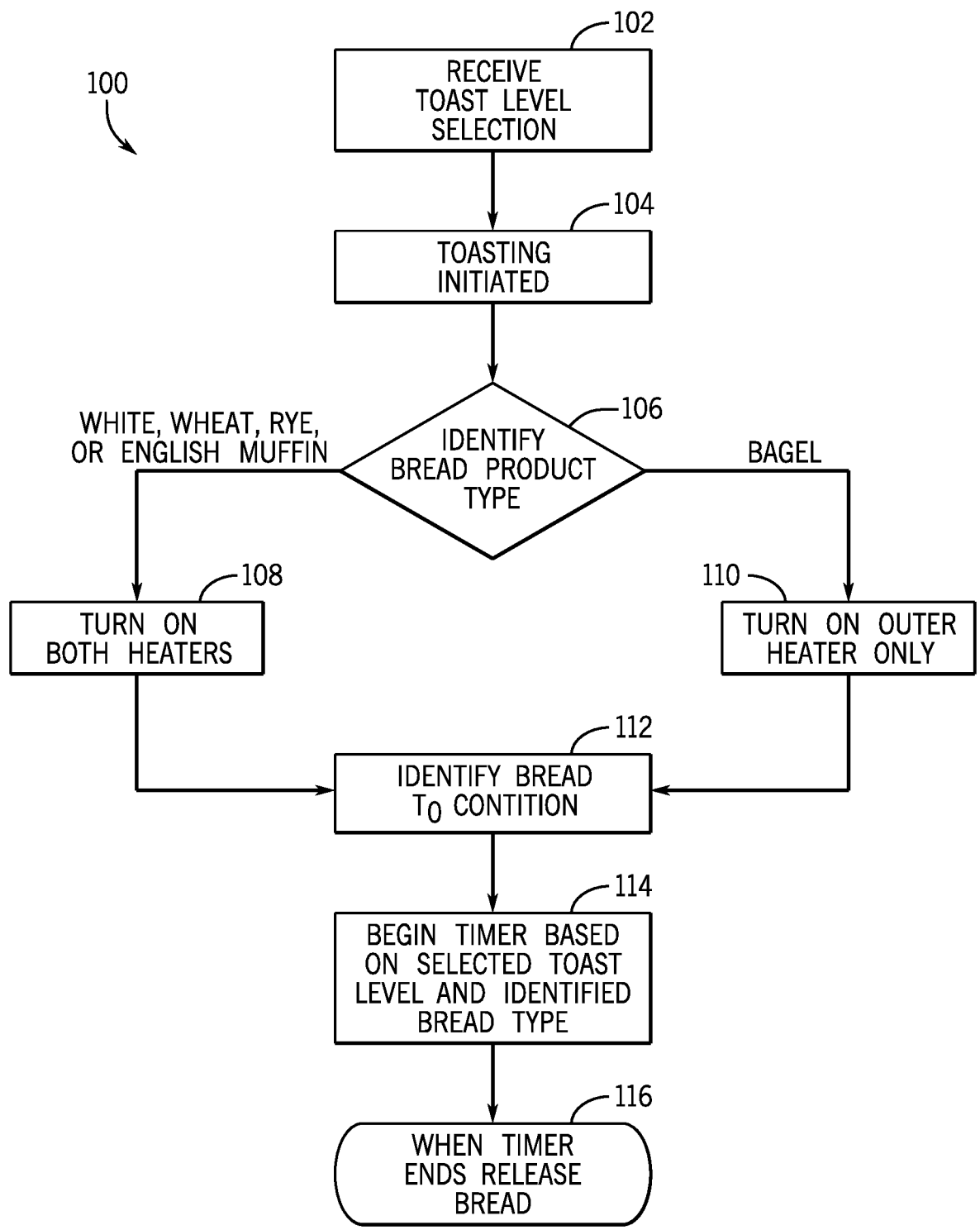
FIG. 8 is a flow chart that depicts an example of a method of toasting.

FIG. 8 is a flowchart that depicts an example of a method 100 of toasting, which may be carried out with one of the toasters as described herein. The method 100 begins at 102 with a toasting level selection. In examples, this may be a 1-3 or a 1-5 whole number scale representative of progressively darker levels of toasting. Next, at 104 the toasting is initiated. As previously described, the toasting process may be initiated by depressing one or both of the handles 18 to move the racks 16 and lids 22 from the open condition to the closed condition to lower the bread product into the toasting chambers 32. In other examples, the bread product may be loaded into the toasting chambers 32 with a separate interaction, and the toasting initiated by way of a separate input, for example a press of a physical or graphical user interface button.

Once the toasting is initiated, the toaster 10 may then identify the type of the bread product within the toasting chamber 32. In one example, this too may be provided by a user input for example with the press of a physical or a GUI button. In another example, this is performed by the controller 42 in response to receipt of images of the bread product from the camera 30. In an example, the controller executes an image analysis algorithm that has been trained on data sets of example images of the types of bread classified for the toaster. In an example, these data sets included 1000 or more images of each of the types of: white bread, wheat bread, rye bread, English muffins, and bagels. In other examples, buns, Kaiser rolls, hoagies, or croissants are further examples of bread product types for which the algorithm may be trained. From this image analysis, the controller 42 may identify the type of bread product loaded into the toaster.

Once the bread product type has been identified, the controller 42 will accordingly operate the heating elements 20 in a manner to toast the identified bread product. This exemplarily means toasting with the heating elements 20 on both sides of the bread product at full power at 108. This operation may be performed if the bread type is identified to have two crumb sides or if the customer preferences otherwise call for a same level of toasting on both sides of the bread product. Alternatively, the controller 42 may operate the toaster 10 operated with one of the heating elements 20 either off or at a reduced power, such as in the case of toasting a bagel. As noted above, reduced power output of one heating element 20 side can be achieved through PWM control.

The inventors have discovered that once a bread product reaches an initial state of toasting, the toasting process can proceed regularly and predicably for the conditions within the toaster. Individual bread products of the same bread product type may enter the toasting chamber 32 with different initial physical properties, for example, temperature or hydration. In one example, the same type of bread product may be frozen or fresh. It undoubtedly takes a longer exposure to thermal treatment to toast the frozen bread product to a target level of toasting than it takes for a fresh bread product to reach the target level of toasting when exposed to the same thermal treatment. However, once the bread product begins toasting, the duration of the toasting to reach a predetermined toasting level from the initial toasting level remains substantially the same and independent of the starting conditions of the bread product.

Figure 9:
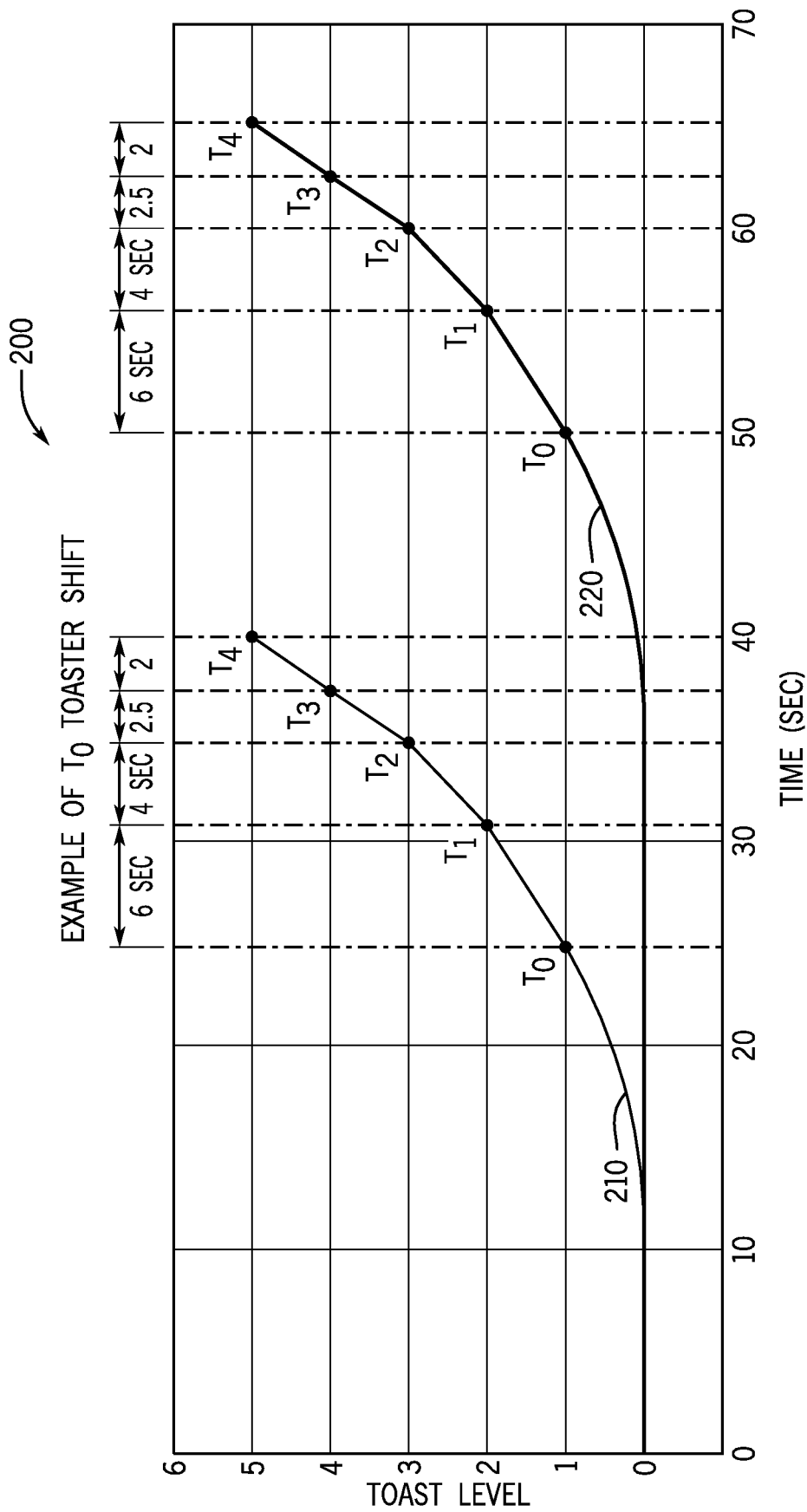
FIG. 9 is a graph depicting two simulated curves of toasting times.

FIG. 9 is a graph 200 depicting two simulated curves of toasting times. Graph 210 represents a toasting time and resulting toasting level for a fresh bread product. Graph 220 represents a toasting time and resulting toasting level for a frozen bread product. It is to be noted that the two example bread products take different lengths of time to reach an initial toasting level $T_0$, but once $T_0$ is reached the curves of the progression of the bread product through the toasting levels are the same with each subsequent toasting level being reached at a same time after $T_0$ was reached. The initial toasting level $T_0$ represents when the bread product is in a condition to begin visible progression of the Maillard reaction. In examples, this may coincide with the bread product reaching a minimum temperature and humidity level which may vary depending upon the ambient conditions and the bread product itself.

Returning to FIG. 8 and the method 100, the controller 42 next operates at 112 to identify when the bread product has reached initial toasting level $T_0$. To do so, the controller 42 receives image data from the camera 30 and analyzes the image data with an image analysis algorithm trained to identify the initial appearance of toasting on the surface of the bread product. To do so, the image analysis algorithm was trained with datasets of images of the initial toasting level $T_0$ condition for each of the identified types of bread products. The algorithm further uses segmentation of the field of view of the image data to look for subregions within the field of view which are exhibiting the initiation of toasting as defined by the training data set. Confidence intervals may be calculated for these subregions within the field of view and the initial toasting level $T_0$ condition identified, when the confidences within one or more of these subregions reach one or more thresholds.

After the $T_0$ condition has been identified, a toasting time is selected and a timer started at 114. As exemplified by the graph of FIG. 9, the toasting time from the $T_0$ condition is dependent upon the bread product type and received toasting level. Therefore, the toasting time may be selected at any time once the bread product type and the toasting level are known to the controller 42. At the $T_0$ condition, the controller 42 starts a timer and counts the toasting time. At 116, when the toasting time has elapsed, the toaster releases the bread product from the toasting chamber 32 and ends energization to the heating elements.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A toaster comprising:
a housing defining a toasting chamber;
a rack configured to hold a bread product within the toasting chamber;
a lid movable with the rack between an open condition and a closed condition, wherein in the closed condition, the lid occludes an opening into the toasting chamber;
a heating element arranged within the toasting chamber interior of the housing and relative to the rack and operable to direct IR energy to the bread product on the rack;
an image capture device positioned exterior of the housing, that operates to acquire image data of the bread product on the rack;
a controller that receives the image data, the controller processor analyzes successive image data received from the image capture device, and based upon the analysis of the image data operates the heating element to achieve a predetermined toasting level of the bread product and then turn off the heating element; and
a shutter positioned between the image capture device and the toasting chamber and movable away from the image capture device, wherein the controller is configured to operate the shutter in coordination with the image capture device to move the shutter away from the image capture device prior to a first acquisition of image data, to return the shutter to the position between the image capture device and the toasting chamber, and to subsequently move the shutter away from the image capture device prior to a second acquisition of image data.

2. The toaster of claim 1, wherein the lid is movably connected to the housing relative to the opening through the housing, the rack movable relative to the opening to receive and expel the bread product through the opening.

3. The toaster of claim 1, wherein the lid is configured to maintain a thermal environment within the toasting chamber during operation of the toaster.

4. The toaster of claim 1, further comprising an aperture through the housing between the image capture device and the toasting chamber.

5. The toaster of claim 4, further comprising a convex lens positioned between the image capture device and the aperture.

6. The toaster of claim 5, wherein the convex lens is positioned with a focal point of the convex lens at the aperture.

7. The toaster of claim 4, further comprising a mirror positioned exterior of the housing and proximate the aperture, wherein the mirror is angled relative to the aperture and the image capture device is positioned such that a field of view of the image capture device captures a reflection of the bread product in the toasting chamber through the aperture.

8. The toaster of claim 7, wherein the housing is insulated to provide a thermal barrier between the toasting chamber and the image capture device.

9. The toaster of claim 8, further comprising an LED light ring positioned between the mirror and the image capture device.

10. The toaster of claim 1, wherein the image capture device is a camera, the camera configured to acquire a plurality of images of the bread product in the toasting chamber and the controller further configured to process the acquired images and to determine the toasting of the food product and to control the toasting process carried out by the toaster.

11. The toaster of claim 1, wherein the image capture device is an RGB sensor.

12. The toaster of claim 1, wherein the controller selects a toasting time based upon an identification of a bread product type and an input of a toasting level and the controller analysis of the image data determines when the bread product reaches an initial toasting level ($T_0$), starts a timer, and terminates the toasting operation when the selected toasting time has elapsed.

13. The toaster of claim 12, wherein the controller determines the bread product has reached the initial toasting level upon detection of toasting in the image data in one or more subregions within the field of view of the image capture device.

14. The toaster of claim 13, wherein the controller further analyzes the image data to determine the identification of the bread product type.

15. The toaster of claim 1, wherein the heating element comprises a plurality of heating element segments arranged in a low density portion proximate the lid and a high density portion away from the lid, wherein the heating element segments in the high density portion are spaced apart at a first distance, and the heating element segments in the low density portion are spaced apart at a second distance, the second distance being greater than the first distance.

16. The toaster of claim 15, wherein the first distance is 25%-80% of the second distance.

17. A method of toasting a bread product using the toaster of claim 1, the method comprising:
receiving a toasting level for the bread product;
identifying a bread product type;
closing a lid to occlude the toasting chamber with a bread product therein;
operating the heating element to emit IR energy at the bread product;
successively obtaining image data of a field of view comprising a portion of the bread product;
analyzing the successively obtained image data;
operating the heating element to achieve the toasting level of the bread product; and
subsequently turning off the heating element and ejecting the bread product from the toasting chamber.

18. The method of claim 17, wherein analyzing the successively obtained image data comprises analysis of image data starting with energization of the heating element until determining that the bread product has reached an initial toasting level (To), and further comprising:
selecting a toasting time based upon the identification of the bread product type and the received toasting level;
starting a timer upon determining that the initial toasting level has been reached; and
turning off the heating element and ejecting the bread product from the toasting chamber, when the toasting time has elapsed on the timer.

19. The method of claim 18, wherein identifying the bread product type further comprises analyzing the image data to determine an identification of the bread product type.

* * * * *